Patented Dec. 2, 1930

1,783,607

UNITED STATES PATENT OFFICE

HENRY DREYFUS, OF LONDON, ENGLAND

COLORATION OF MATERIALS MADE OF OR CONTAINING CELLULOSE DERIVATIVES

No Drawing. Original application filed January 22, 1927, Serial No. 162,937, and in Great Britain November 23, 1926. Divided and this application filed December 27, 1927. Serial No. 242,976.

This invention relates to the dyeing, printing or stencilling of threads, yarns, knitted or woven fabrics, or other products made of or containing cellulose acetate or other organic-acid esters of cellulose, such for example as cellulose formate, propionate, or butyrate, or the product obtained by the treatment of alkylized cellulose with p-toluene sulphochloride (e. g. the product known as "immunized cotton"), or made of or containing cellulose ethers, such as methyl, ethyl, or benzyl cellulose, or the corresponding condensation products of cellulose and glycols or other polyhydric alcohols, all of which are hereinafter referred to as organic substitution derivatives of cellulose.

This application is a division of application Serial No. 162,937, filed January 22, 1927.

According to the present invention materials made of or containing one or more of the said organic substitution derivatives of cellulose are dyed or otherwise colored with coloring matters or compounds comprising one or more aliphatic hydroxy-thio-ether groupings, that is to say with compounds in which an aryl dye nucleus is linked through sulphur with an aliphatic side chain or chains containing one, two, three or more hydroxy groups. Alternatively such coloring matters may be produced on the fibre or material.

Such coloring matters or compounds may readily be prepared, for example by treating a thio-phenolic body or salts thereof with a halo-hydrin, such for example as ethylene chlorhydrin, propylene chlorhydrins, glyceryl chlorhydrins, glyceryl dichlorhydrins, epichlorhydrin, chlorbutylene glycol, erythrol dichlorhydrin, mannitol mono- or dichlorhydrin and the like, or an alkylene oxide, such as ethylene oxide or propylene oxide, or a ketone such as acetone.

They may further be prepared by fusing aliphatic hydroxy mercaptans with a nitro derivative of an aryl dye nucleus or component thereof in presence of caustic alkali or by treating a halogen derivative of an aryl dye nucleus or component thereof with an aliphatic hydroxy mercaptan.

The following examples of compounds for use according to the present invention and of the methods of preparing them are intended to illustrate the invention and not to be in any way limitative.

A. ANTHRAQUINONE DYESTUFFS

Example 1

1-amino-4-hydroxyanthraquinone is diazotized in concentrated sulphuric acid solution, the diazo-hydroxy-anthraquinone sulphate dissolved in water and heated with potassium thiocyanate solution. The hydroxy anthraquinone thiocyanate is heated under a reflux with caustic soda in presence of methylated spirit to obtain the corresponding mercaptan which is then precipitated with hydrochloric acid and condensed with glyceryl α-chlorhydrin. The product is reduced to the leuco state with caustic soda and hydrosulphite and the dried leuco body refluxed on a water bath with methylamine. After oxidation the dyestuff obtained has the formula,

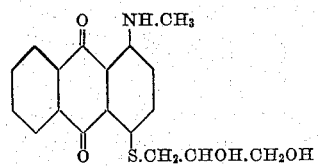

Example 2

Chloranthrapyridone is condensed with monothioglycerol ($CH_2OH.CHOH.CH_2SH$) to obtain the dyestuff

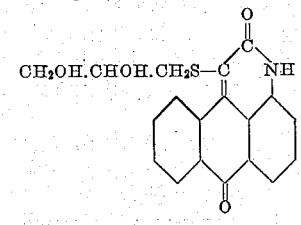

B. AZO DYESTUFFS

Example 3 p-nitro-thio-phenol is condensed with β-ketopropyl alcohol ($CH_3.CO.CH_2OH$) by warming in benzene. The product is reduced with stannous chloride and hydrochloric acid to the amino compound which is then diazotized, coupled with α-naphthylamine, rediazotized and coupled with phenol to obtain the dyestuff

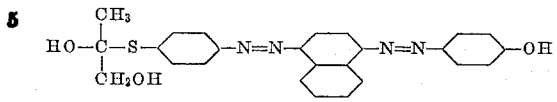

With regard to the dyestuffs or compounds to be applied according to the present invention, it may be stated that the greater the number of hydroxy groups in the side chain or chains, the greater will be the solubility of the dyestuffs or compounds in water and for obvious reasons the use of such water soluble compounds is to be preferred.

The dyestuffs may be applied to the goods in solution (where they are sufficiently soluble), or in aqueous suspension or they may be brought into colloidal solution by any of the methods known in the art such as by grinding (for example in colloid mills), by dissolving in a solvent and pouring into water containing or not containing protective colloids, by pretreating with solubilizing agents, or by other methods. Of the solubilizing agents which are suitable for obtaining such dispersions I may mention those described in U. S. Patents Nos. 1,618,413, 1,618,414, and 1,694,413, and in British Patents Nos. 273,819 and 273,820 or the corresponding U. S. applications S. No. 134,138 and S. No. 176,289; viz. bodies of oily or fatty characteristics, namely higher fatty acids or sulphonated or other derivatives thereof containing salt-forming groups, such as sulphoricinoleic or other sulphonated fatty acids or salts of such acids or bodies, for instance their alkali or ammonium salts, used alone or in conjunction with auxiliary solvents (i. e. substances having a solvent action upon the dyestuffs) as described for example in U. S. Patent No. 1,690,481; carbocyclic compounds containing in their structure one or more salt-forming groups or salts of such compounds; sulphoaromatic fatty acids or salts thereof; and soluble resin soaps or sodium or other soluble salts or soaps of resin acids.

It is to be understood that the invention extends to the use of dyestuffs of any series. They may contain in addition to one, two, three or more hydroxy groups any other desired substituents.

The invention further comprises the dyeing or otherwise coloring of mixed goods comprising for example, in addition to one or more of the organic substitution derivatives, silk, wool or cellulose fibres natural or artificial such as cotton or the regenerated cellulose type of artificial silk, in solid or contrasting shades according to the affinity of the non-ester and non-ether portion of the goods. The goods may be dyed with other dyestuffs for the non-ester and non-ether portion thereof either before, after or together with the dyestuffs of the present invention. An example of the dyeing of a mixed fabric is as follows.

*Example 4*

To dye a reddish-orange shade on the cellulose acetate component and a violet shade on the cotton component of 25 kilos of a mixed woven fabric containing 60% of its weight of cotton warp and 40% of its weight of cellulose acetate weft. The fabric is scoured and placed in position on the dye jig in the customary manner. The beck is then charged with 250 litres of soft water containing the following two liquors:—

(a) A liquor prepared by grinding up 100 grams of the dyestuff prepared according to Example 1 with 150 grams of 50% sodium sulphoricinoleate, heating the mass to obtain homogeneity and adding while stirring 50 litres of boiling 2% aqueous sodium oleate solution.

(b) A liquor prepared by dissolving 750 grams of the sodium salt of dimethoxy diphenyl-disazo-4-sulpho-1.7-dihydroxy-naphthalene-m-toluylene diamine in 75 litres of boiling soft water.

Dyeing is conducted in the usual manner, the anthraquinone derivative being taken up almost exclusively by the cellulose acetate and the azo dye by the cotton. When the desired depth has been achieved, the fabric is washed off, dried and finished as required.

The term dyeing in the claims is to be understood to include printing and stencilling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a coloring compound which comprises at least one aliphatic hydroxy thio-ether grouping.

2. Process for dyeing material comprising an organic substitution derivative of cellulose, comprising dyeing the material with a coloring compound which comprises at least one glyceryl thio-ether grouping.

3. Process for dyeing material comprising an organic substitution derivative of cellulose, comprising dyeing the material with an aqueous colloidal solution of a coloring compound which comprises at least one aliphatic hydroxy thio-ether grouping.

4. Process for dyeing material comprising an organic substitution derivative of cellulose, comprising dyeing the material with an anthraquinone coloring compound which comprises at least one aliphatic hydroxy thio-ether grouping.

5. Process for dyeing material comprising an organic substitution derivative of cellulose, comprising dyeing the material with an anthraquinone coloring compound which comprises at least one glyceryl thio-ether grouping.

6. Process for dyeing material comprising an organic substitution derivative of cellulose, comprising dyeing the material with an aqueous colloidal solution of an anthraquinone coloring compound which comprises at least one alphatic hydroxy thio-ether grouping.

7. Process for dyeing material comprising cellulose acetate, comprising dyeing the material with a coloring compound which comprises at least one aliphatic hydroxy thio-ether grouping.

8. Process for dyeing material comprising cellulose acetate comprising dyeing the material with a coloring compound which comprises at least one glyceryl thio-ether grouping.

9. Process for dyeing material comprising cellulose acetate, comprising dyeing the material with an aqueous colloidal solution of a coloring compound which comprises at least one aliphatic hydroxy thio-ether grouping.

10. Process for dyeing material comprising cellulose acetate, comprising dyeing the material with an anthraquinone coloring compound which comprises at least one aliphatic hydroxy thio-ether grouping.

11. Process for dyeing material comprising cellulose acetate, comprising dyeing the material with an anthraquinone coloring compound which comprises at least one glyceryl thio-ether grouping.

12. Process for dyeing material comprising cellulose acetate, comprising dyeing the material with an aqueous colloidal solution of an anthraquinone coloring compound which comprises at least one aliphatic hydroxy thio-ether grouping.

13. Material comprising an organic substitution derivative of cellulose, dyed with a coloring compound which comprises at least one aliphatic hydroxy thio-ether grouping.

14. Material comprising cellulose acetate, dyed with a coloring compound which comprises at least one aliphatic hydroxy thio-ether grouping.

In testimony whereof I have hereunto subscribed my name.

HENRY DREYFUS.